United States Patent
Ishii et al.

(10) Patent No.: US 7,522,890 B2
(45) Date of Patent: Apr. 21, 2009

(54) COMMUNICATION SYSTEM, BASE STATION, RADIO NETWORK CONTROLLER, AND TRANSMISSION POWER CONTROLLING METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 586 days.

(21) Appl. No.: 11/332,176

(22) Filed: Jan. 17, 2006

(65) Prior Publication Data

US 2006/0183438 A1 Aug. 17, 2006

(30) Foreign Application Priority Data

Jan. 17, 2005 (JP) ............................. 2005-009711

(51) Int. Cl.
*H04B 1/02* (2006.01)
(52) U.S. Cl. .................. 455/101; 455/522; 375/267
(58) Field of Classification Search ............. None
See application file for complete search history.

(56) References Cited

U.S. PATENT DOCUMENTS 5,748,669 A * 5/1998 Yada .................... 375/267
6,807,401 B2 * 10/2004 Boyle ................... 455/101
7,058,363 B2 * 6/2006 Hottinen et al. ........... 455/522

FOREIGN PATENT DOCUMENTS

DE 102 20 930 A 1 11/2003

OTHER PUBLICATIONS

"3$^{rd}$ Generation Partnership Project; Technical Specification Radio Access Network; Physical layer procedures (FDD) (Release 6)", 3GPP TS 25.214, V6.4.0, Dec. 2004, pp. 1-67.
Akhmad Unggul Priantoro, et al., "Novel Sir Measurement Method for Modified Closed Loop Transmit Diversity in W-CDMA", IEEE, XP10754538A, vol. 1, 2004, pp. 17-21.
Shirish Nagaraj, et al., "Antenna Verification for Closed Loop Transmit Diversity in UMTS", IEEE, XP10787586A, 2004, pp. 3792-3796.
Alexander Seeger, et al., "Antenna Weight Verification for Closed-Loop Downlink Eigenbeamforming", IEEE, XP10636096A, vol. 1 of 3, 2002, pp. 982-986.

* cited by examiner

*Primary Examiner*—Thanh C Le
(74) *Attorney, Agent, or Firm*—Oblon, Spivak, McClelland, Maier & Neustadt, P.C.

(57) ABSTRACT

A communication system causes a base station to transmit a downlink control signal to a mobile station through a downlink control channel, and causes the base station to transmit a downlink data signal to the mobile station through a downlink data channel. The communication system includes a diversity judging unit configured to judge whether or not transmission diversity control for adjusting a carrier phase difference between multiple downlink signals transmitted through multiple antennas is performed. The communication system also includes a power offset value deciding unit configured to control transmission power of the downlink control signals based on a result of judgment by the diversity judging unit.

10 Claims, 6 Drawing Sheets

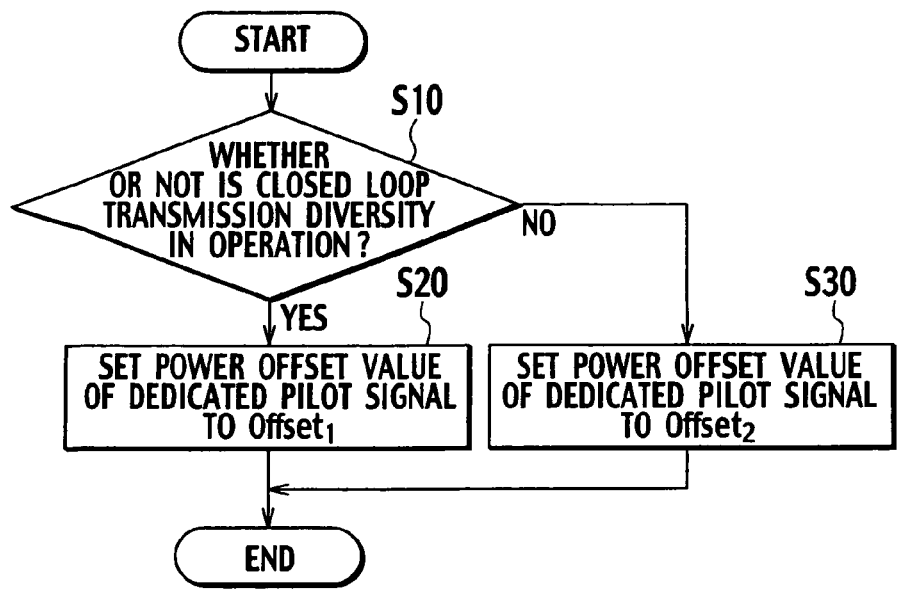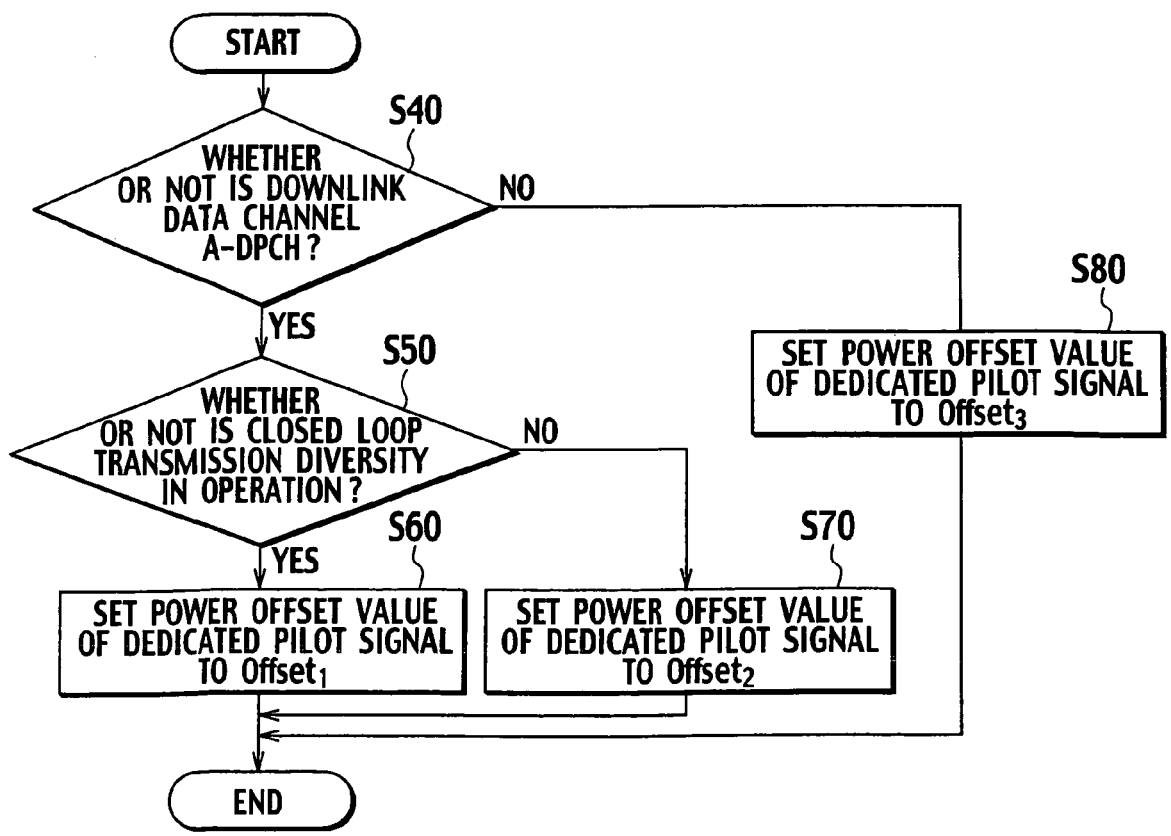

COMMUNICATION SYSTEM, BASE STATION, RADIO NETWORK CONTROLLER, AND TRANSMISSION POWER CONTROLLING METHOD

BACKGROUND OF THE INVENTION

1. Field of the Invention

The present invention relates to a communication system for controlling a transmission power of a downlink control signal, a base station, a radio network controller, and a transmission power controlling method.

2. Description of the Related Art

A phenomenon of fluctuation in a receiving condition of a data signal received by a mobile station or a base station (such a phenomenon is so-called a "fading phenomenon") may occur in the radio communication, and occurrence of a fading phenomenon may lead to substantial deterioration in the transmission quality (namely, characteristics including a bit error rate and the like).

Meanwhile, a technique called "transmission diversity control" is generally known to be a method for reducing deterioration of the transmission quality attributable to occurrence of a fading phenomenon. Now, "closed loop transmission diversity control" a type of the "transmission diversity control" will be described below.

Specifically, a transmitter side (hereinafter referred to as a base station) generates downlink data signals and downlink control signals for two lines (hereinafter collectively referred to as downlink signals) and common pilot signals for the two lines, and then generates multiplexed signals for the two lines by multiplexing the downlink signals with the common pilot signals. Then, the base station transmits the multiplexed signals for the two lines to a receiver side (hereinafter referred to as a mobile station) through two antennas.

At this time, the base station multiplies the downlink signals by complex weights corresponding to the respective downlink signals based on feedback information (hereinafter abbreviated as FBI) received from the mobile station, and spreads the downlink signals that are multiplied by the complex weights. Here, the downlink data signals are carried by a downlink dedicated physical data channel (DPDCH), while the downlink control signals are carried by a downlink dedicated physical control channel (DPCCH).

Meanwhile, the base station spreads the common pilot signals for the two lines by use of an identical spreading code. Here, the spreaded common pilot signals are configured to be mutually orthogonal and are carried in an identical carrier phase by a downlink common pilot channel (CPICH).

On the other hand, the mobile station despreads the common pilot signals for the two lines transmitted through the two antennas, and calculates a carrier phase difference between the common pilot signals for the two lines. Then, the mobile station generates the feedback information (the above-mentioned FBI) for adjusting a carrier phase difference of the downlink signals based on the calculated carrier phase difference between the common pilot signals. Here, the FBI is carried by an uplink dedicated physical control channel (DPCCH).

In this way, the base station reduces deterioration in the transmission quality attributable to occurrence of the fading phenomenon by adjusting the carrier phase difference of the downlink signals, which are transmitted through the two antennas, based on the FBI received from the mobile station.

Here, there is a possibility of an error of the FBI in a radio section. If the base station adjusts the carrier phase difference of the downlink signals based on the erroneous FBI, the "closed loop transmission diversity control" will not function effectively.

A technique called antenna verification is known in this regard. In the antenna verification, the mobile station estimates the carrier phase difference of the downlink signals based on dedicated pilot signals which are transmitted through the downlink dedicated physical control channel and the common pilot signals.

In this way, even if there is an error of the FBI in the radio section, the mobile station can decode the downlink signals accurately by estimating the carrier phase difference of the downlink signals in accordance with the antenna verification and performing demodulation and decoding of the downlink signals by use of the estimated carrier phase difference (3GPP TS25.214 V6.4.0).

As described above, the downlink control signals (such as the dedicated pilot signals) transmitted through the downlink dedicated physical control channel is used for the antenna verification that complements the closed loop transmission diversity control.

Therefore, in order to allow the antenna verification and the closed loop transmission diversity control to function effectively, it is preferable to apply large transmission power to the downlink control signals that are transmitted through the downlink dedicated physical control channel.

In the meantime, power resources have a limitation in the radio communication. Accordingly, it is unfavorable to apply large transmission power excessively to the down link control signals that are transmitted through the downlink dedicated physical control channel.

SUMMARY OF THE INVENTION

The present invention has been made to solve the foregoing problems. An object of the present invention is to provide a communication system, a base station, a radio network controller, and a transmission power controlling method, which are capable of effectively utilizing limited power resources and allowing transmission diversity control to function effectively.

A first aspect of the present invention provides a communication system configured to cause a base station to transmit a downlink control signal to a mobile station through a downlink control channel and to cause the base station to transmit a downlink data signal to the mobile station through a downlink data channel. Here, the communication system includes a diversity judging unit configured to judge whether or not transmission diversity control to adjust a carrier phase difference of at least one set of a plurality of the downlink data signals and a plurality of the downlink control signals transmitted through a plurality of antennas is performed, and a transmission power control unit configured to control transmission power of the downlink control signals based on a result of judgment by the diversity judging unit.

According to the communication system of the first aspect, the transmission power control unit controls the transmission power of the downlink control signals based on the result of judgment (whether or not the transmission diversity control is performed) by the diversity judging unit. Therefore, the communication system can effectively utilize the limited power resources and to allow the transmission diversity control to function effectively.

In the communication system according to the first aspect, the transmission diversity control may be closed loop transmission diversity control configured to cause the base station to adjust the carrier phase difference of at least one set of the plurality of the downlink data signals and the plurality of the downlink control signals based on feedback information transmitted by the mobile station through an uplink control channel.

The communication system according to the first aspect may further include a channel judging unit configured to judge whether or not a downlink channel including the downlink data channel and the downlink control channel is a specific downlink channel. Here, the transmission power control unit controls the transmission power of the downlink control signals based on a result of judgment by the channel judging unit.

In the communication system according to the first aspect, the channel judging unit may judge whether or not the downlink channel is an associated downlink dedicated channel to be associated by a downlink shared channel.

In the communication system according to the first aspect, the transmission power control unit may control transmission power of a pilot signal unique to the mobile station to be transmitted through a downlink dedicated control channel.

In the communication system according to the first aspect, the transmission power control unit may control transmission power of a transmission power control signal used to control power for a signal transmitted through an uplink channel, which is transmitted through the downlink dedicated control channel.

In the communication system according to the first aspect, the transmission power control unit controls the transmission power of the downlink control signals such that the transmission power of the downlink control signals becomes larger in a case of performing the transmission diversity control than in a case of not performing the transmission diversity control.

A second aspect of the present invention provides a base station configured to transmit a downlink control signal to a mobile station through a downlink control channel and to transmit a downlink data signal to the mobile station through a downlink data channel. Here, the base station includes a diversity judging unit configured to judge whether or not transmission diversity control to adjust a carrier phase difference of at least one set of a plurality of the downlink data signals and a plurality of the downlink control signals transmitted through a plurality of antennas is performed, and a transmission power control unit configured to control transmission power of the downlink control signals based on a result of judgment by the diversity judging unit.

A third aspect of the present invention provides a radio network controller configured to control a base station which transmits a downlink control signal to a mobile station through a downlink control channel and transmits a downlink data signal to the mobile station through a downlink data channel. Here, the radio network controller includes a diversity judging unit configured to judge whether or not transmission diversity control to adjust a carrier phase difference of at least one set of a plurality of the downlink data signals and a plurality of the downlink control signals transmitted through a plurality of antennas is performed, and a transmission power control unit configured to cause the base station to control transmission power of the downlink control signals based on a result of judgment by the diversity judging unit.

A fourth aspect of the present invention provides a transmission power controlling method applicable to a communication system configured to transmit a downlink control signal to a mobile station through a downlink control channel and to transmit a down link data signal to the mobile station through a downlink data channel. Here, the transmission power controlling method for controlling transmission power of a downlink control signal includes the steps of judging whether or not transmission diversity control to adjust a carrier phase difference of at least one set of a plurality of the downlink data signals and a plurality of the downlink control signals transmitted through a plurality of antennas is performed, and controlling transmission power of the downlink control signals based on a result of judgment whether or not the transmission diversity control is performed.

According to the present invention, it is possible to provide a communication system, a base station, a radio network controller, and a transmission power controlling method, which are capable of effectively utilizing limited power resources and allowing transmission diversity to function effectively.

BRIEF DESCRIPTION OF THE DRAWINGS

FIG. 6 is a flowchart showing an operation of the communication system according to the embodiment of the present invention.

FIG. 7 is a flowchart showing an operation of a communication system according to a modified example of the present invention.

Figure 1:
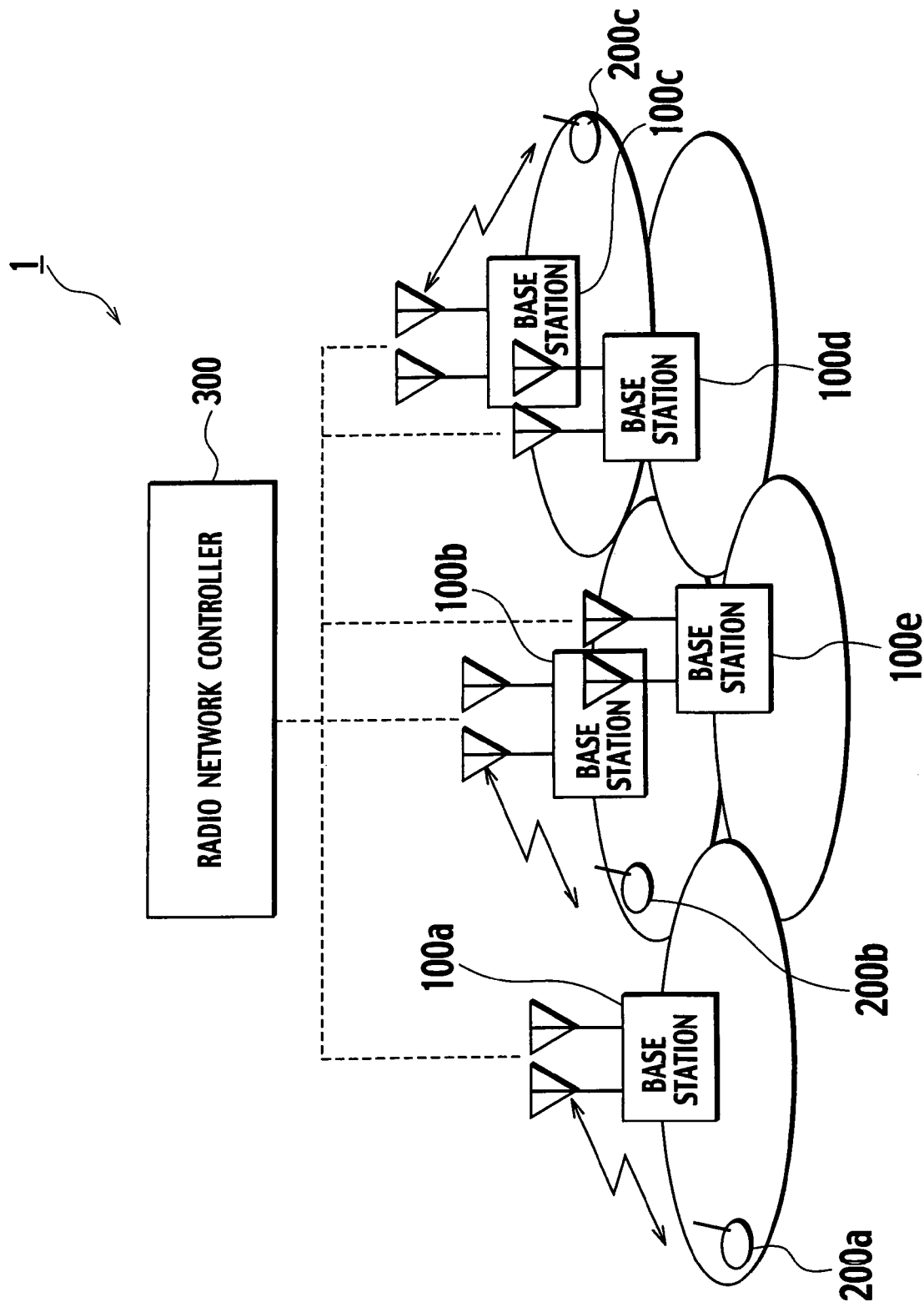
FIG. 1 is a view showing a configuration of a communication system according to an embodiment of the present invention.

DETAILED DESCRIPTION OF THE PREFERRED EMBODIMENTS (Communication System)

Preferred embodiments of the present invention will now be described with reference to the accompanying drawings. In the following description of the drawings, identical or similar elements are designated by identical or similar reference numerals. It is to be noted, however, that the drawings merely show schematic configurations of the present invention.

FIG. 1 is a view showing a configuration of a communication system 1 according to an embodiment of the present invention. As shown in FIG. 1, the communication system 1 includes multiple base stations 100 (base stations 100a to 100e), multiple mobile stations 200 (mobile stations 200a to 200c), and a radio network controller 300.

Here, the base stations 100a to 100e have configurations similar to one another, while the mobile stations 200a to 200c have configurations similar to one another. Therefore, in the following description, these base stations and mobile stations will be collectively referred to as the base station 100 and the mobile station 200, respectively.

The base station 100 communicates with the mobile station 200 located in a cell allocated to the base station 100. Specifically, the base station 100 transmits a downlink control signal to the mobile station 200 through a downlink control channel, and transmits a downlink data signal to the mobile station 200 through a downlink data channel.

Here, the downlink control channel is a downlink dedicated physical control channel (DPCCH) included in a downlink dedicated physical channel (DPCH) allocated to the mobile station 200 individually.

Meanwhile, the downlink data channel is a downlink dedicated physical data channel (DPDCH) included in the downlink dedicated physical channel (DPCH) allocated to the mobile station 200 individually.

Here, a physical downlink shared channel (PDSCH) or a high speed physical downlink shared channel (HS-PDSCH) shared by and assigned to the multiple mobile stations 200 is also known as the downlink channel.

The mobile station 200 communicates with the base station 100 corresponding to the cell in which the mobile station 200 is located. Specifically, the mobile station 200 transmits an uplink control signal to the base station 100 through an uplink control channel, and transmits an uplink data signal to the base station 100 through an uplink data channel.

Here, the uplink control channel is an uplink dedicated physical control channel (DPCCH) included in an uplink dedicated physical channel (DPCH) allocated to the mobile station 200 individually.

Meanwhile, the uplink data channel is an uplink dedicated physical data channel (DPDCH) included in the uplink dedicated physical channel (DPCH) allocated to the mobile station 200 individually.

The radio network controller 300 is connected to the multiple base stations 100, and controls the base stations 100 connected thereto. For example, the radio network controller 300 modifies an SIR target value, which is referenced by each of the base stations 100 upon generation of a TPC command, based on quality (block error rate or the like) of a signal transmitted from the mobile station 200 (outer loop control).

Figure 2:
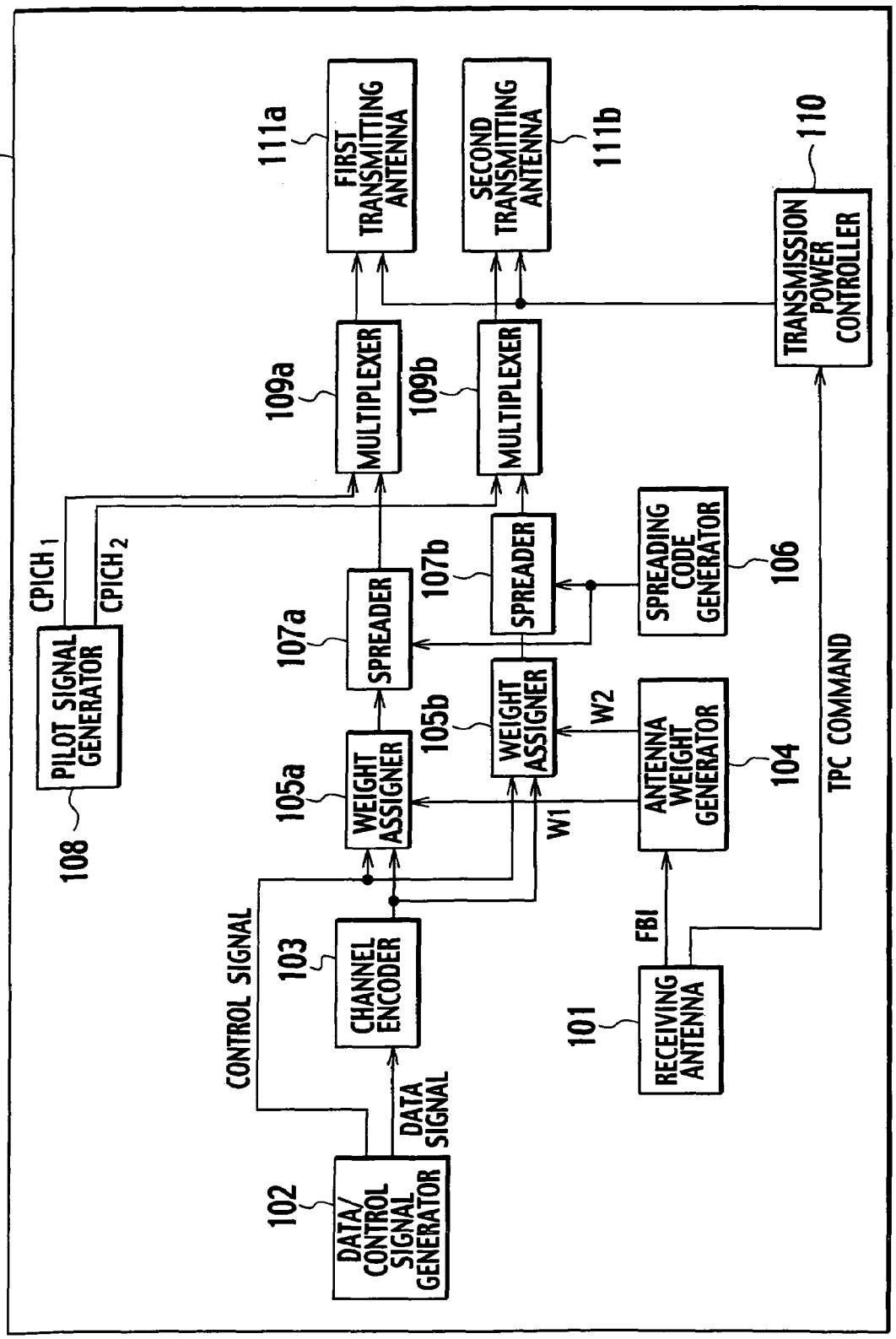
FIG. 2 is a block diagram showing a configuration of a base station according to the embodiment of the present invention.

Now, the configuration of the above-mentioned base station 100 will be described with reference to the accompanying drawing. FIG. 2 is a block diagram of the base station 100 according to the embodiment of the present invention. In this embodiment, the base station 100 adjusts a carrier phase difference of at least any one set of multiple downlink data signals and multiple downlink control signals (hereinafter collectively referred to as downlink signals) transmitted through multiple antennas by means of closed loop transmission diversity control.

As shown in FIG. 2, the base station 100 includes a receiving antenna 101, a data/control signal generator 102, a channel encoder 103, an antenna weight generator 104, multiple weight assigners 105 (a weight assigner 105*a* and a weight assigner 105*b*), a spreading code generator 106, multiple spreaders 107 (a spreader 107*a* and a spreader 107*b*), a pilot signal generator 108, multiple multiplexers 109 (a multiplexer 109*a* and a multiplexer 109*b*), a transmission power controller 110, and multiple transmitting antennas 111 (a first transmitting antenna 111*a* and a second transmitting antenna 111*b*).

Note that the base station 100 includes the receiving antenna 101 and the transmitting antennas 111 separately in this embodiment. However, the present invention is not limited only to this configuration. It is also possible to provide a single antenna configured to perform transmission and reception of signals.

Moreover, the base station 100 further includes a transceiver/receiver for transmitting and receiving information to and from the radio network controller 300. However, the transceiver/receiver is omitted in FIG. 2 for the purpose of simplifying the explanation.

The receiving antenna 101 receives uplink control signals and uplink data signals from the mobile station 200 through the uplink control channel and the uplink data channel. For example, the receiving antenna 101 receives a transmission power control (TPC) command for the downlink channel, feedback information (FBI), and a transport format combination indicator (TFCI) as the uplink control signals.

Here, the TPC command for the downlink channel is a signal for controlling transmission power of the downlink data signal to be transmitted through the downlink dedicated data channel. Meanwhile, the FBI is a signal generated by the mobile station 200 for performing the closed loop transmission diversity control. Further, the TFCI is a signal for specifying a combination of transport channels.

Meanwhile, the receiving antenna 101 inputs the FBI to the antenna weight generator 104, and inputs the TPC command for the downlink channel to the transmission power controller 110.

The data/control signal generator 102 generates the downlink control signals and the downlink data signals. Here, the downlink control signals include a transmission power control (TPC) command for the uplink channel, the transport format combination indicator (TFCI), a dedicated pilot signal (the pilot signal unique to the mobile station), and the like.

The TPC command for the uplink channel is a signal for controlling transmission power of the uplink data signal to be transmitted through the uplink channel. Meanwhile, as described previously, the TFCI is the signal for specifying the combination of transport channels. Further, the dedicated pilot signal is a signal mainly used for the downlink transmission power control. Here, the dedicated pilot signal is used for antenna verification and the like when the mobile station 200 performs the antenna verification in the case of performing the closed loop transmission diversity control.

The channel encoder 103 encodes the downlink data signal generated by the data/control signal generator 102, by use of an error correction coding such as a convolutional coding or a turbo coding.

The antenna weight generator 104 generates the following complex weights, $$W_1 = A_1 e^{i\phi_1}, \text{ and}$$

$$W_2 = A_2 e^{i\phi_2}$$

for adjusting a carrier phase difference between the downlink signals transmitted through the first transmitting antenna 111*a* and the second transmitting antenna 111*b* based on the FBI received through the receiving antenna 101. Moreover, the antenna weight generator 104 inputs the following complex weight, $$W_1 = A_1 e^{i\phi_1}$$

to the weight assigner 105*a*, and inputs the following complex weight, $$W_2 = A_2 e^{i\phi_2}$$

to the weight assigner 105*b*.

Note that the closed loop transmission diversity control is described in 3GPP TS25.214. Now, a case of adjusting the carrier phase difference of a slot n+1 by the antenna weight generator 104 in accordance with the "closed loop transmission diversity control mode 1" described in 3GPP TS25.214 will be explained.

In the "closed loop transmission diversity control mode 1", the carrier phase difference of the downlink signals transmitted through the second transmitting antenna 111*b* at resolution of π/4 is adjusted so as to allow the carrier phase difference of the downlink signals to become the same phase. Here, in a slot n, amplitudes of signals transmitted from the first transmitting antenna 111a and the second transmitting antenna 111b are expressed by:

$$A_{1,n} = A_{2,n} = \frac{1}{\sqrt{2}}$$

Meanwhile, carrier phases are expressed by:

$\phi_{1,n}=0$, and $\phi_{2,n}=\{\pm\pi/4, \pm 3\pi/4\}$

First, in response to a result of decoding the FBI, namely, $\hat{b}_n$ (when there is no error of the FBI in a radio section, then, $\hat{b}_n = b_n$), the antenna weight generator 104 calculates the following provisional carrier phase of a signal transmitted from the second transmitting antenna 111b through the downlink dedicated channel at the slot n+1:

$\phi'_{2,(n+1)}$

To be more precise, when the n is an even number, the antenna weight generator 104 calculates the provisional carrier phase, namely, $\phi'_{2,(n+1)}$ based on the following formula:

if $\hat{b}_n=0$ then $\phi'_{2,(n+1)}=0$, otherwise $\phi'_{2,(n+1)}=\pi$

On the contrary, when the n is an odd number, the antenna weight generator 104 calculates the provisional carrier phase, namely, $\phi'_{2,(n+1)}$ based on the following formula:

if $\hat{b}_n=0$ then $\phi'_{2,(n+1)}=\pi/2$, otherwise $\phi'_{2,(n+1)}=-\pi/2$ Moreover, the antenna weight generator 104 calculates a carrier phase at the slot n+1 based on the carrier phase at the slot n and the provisional carrier phase at the slot n+1. In this case, the antenna weight generator 104 calculates the carrier phase at the slot n+1, namely, $\phi_{2,(n+1)}$ based on the following formula:

$\phi_{2,(n+1)}=(\phi_{2,n}+\phi'_{2,(n+1)})/2$

Meanwhile, based on the calculated carrier phase at the slot n+1, namely, $\phi_{2,(n+1)}$ the antenna weight generator 104 generates the following complex weight:

$W_2=A_2 e^{i\phi_2}$

The weight assigner 105a multiplies the downlink control signal generated by the data/control signal generator 102 and the downlink data signal encoded by the channel encoder 103, by the following complex weight:

$W_1=A_1 e^{i\phi_1}$

Similarly, the weight assigner 105b multiplies the downlink control signal generated by the data/control signal generator 102 and the downlink data signal encoded by the channel encoder 103, by the following complex weight:

$W_2=A_2 e^{i\phi_2}$

The spreading code generator 106 generates a spreading code (such as a channelization code or a scrambling code) for spreading the signals to be transmitted to the mobile station 200.

The spreader 107a spreads the downlink signals which are multiplied by complex weight, namely, $W_1=A_1 e^{i\phi_1}$ by the weight assigner 105a using the spreading code generated by the spreading code generator 106.

Similarly, the spreader 107b spreads the downlink signals, which are multiplied by complex weight, namely, $W_2=A_2 e^{i\phi_2}$ by the weight assigner 105b using the spreading code generated by the spreading code generator 106.

The pilot signal generator 108 generates common pilot signals (pilot bits) for two lines. Here, the common pilot signals are signals used for generation of the FBI or channel estimation, which are transmitted through a downlink common pilot channel (CPICH).

The multiplexer 109a multiplexes the downlink signals spreaded by the spreader 107a with one of the common pilot signals (CPICH$_1$) generated by the pilot signal generator 108. Similarly, the multiplexer 109b multiplexes the downlink signals spreaded by the spreader 107b with the other common pilot signal (CPICH$_2$) generated by the pilot signal generator 108.

The transmission power controller 110 controls transmission power of the downlink data signals based on the TPC commands for the downlink channels.

Meanwhile, the transmission power controller 110 controls transmission power of the downlink control signals (including the dedicated pilot signal, the TPC command for the uplink channel, and the like) to be transmitted through the downlink dedicated control channel based on a power offset value to be described later, which is received from the radio network controller 300.

To be more precise, the transmission power controller 110 controls the transmission power of the downlink control signals by adding the power offset value to the transmission power of the above described downlink data signals.

Further, the transmission power controller 110 also controls the transmission power of the common pilot signals for the two lines. Here, the transmission power of the above-described common pilot signals is generally set to a fixed value.

The first transmitting antenna 111a transmits the signals multiplexed by the multiplexer 109a to the mobile station 200 at the transmission power controlled by the transmission power controller 110. Similarly, the second transmitting antenna 111b transmits the signals multiplexed by the multiplexer 109b to the mobile station 200 at the transmission power controlled by the transmission power controller 110.

This embodiment is described on the assumption that the base station 100 includes the configuration to perform the closed loop transmission diversity control. However, the present invention is not limited only to this configuration. The base station 100 may include a configuration to perform control other than the closed loop transmission diversity control.

For example, the base station 100 may include a configuration to perform open loop transmission diversity control. Meanwhile, the base station 100 may include a configuration to transmit signals to the mobile station 200 through a single antenna. Further, the base station 100 may include a function to switch these configurations depending on a condition of a radio section and the like.

Figure 3:
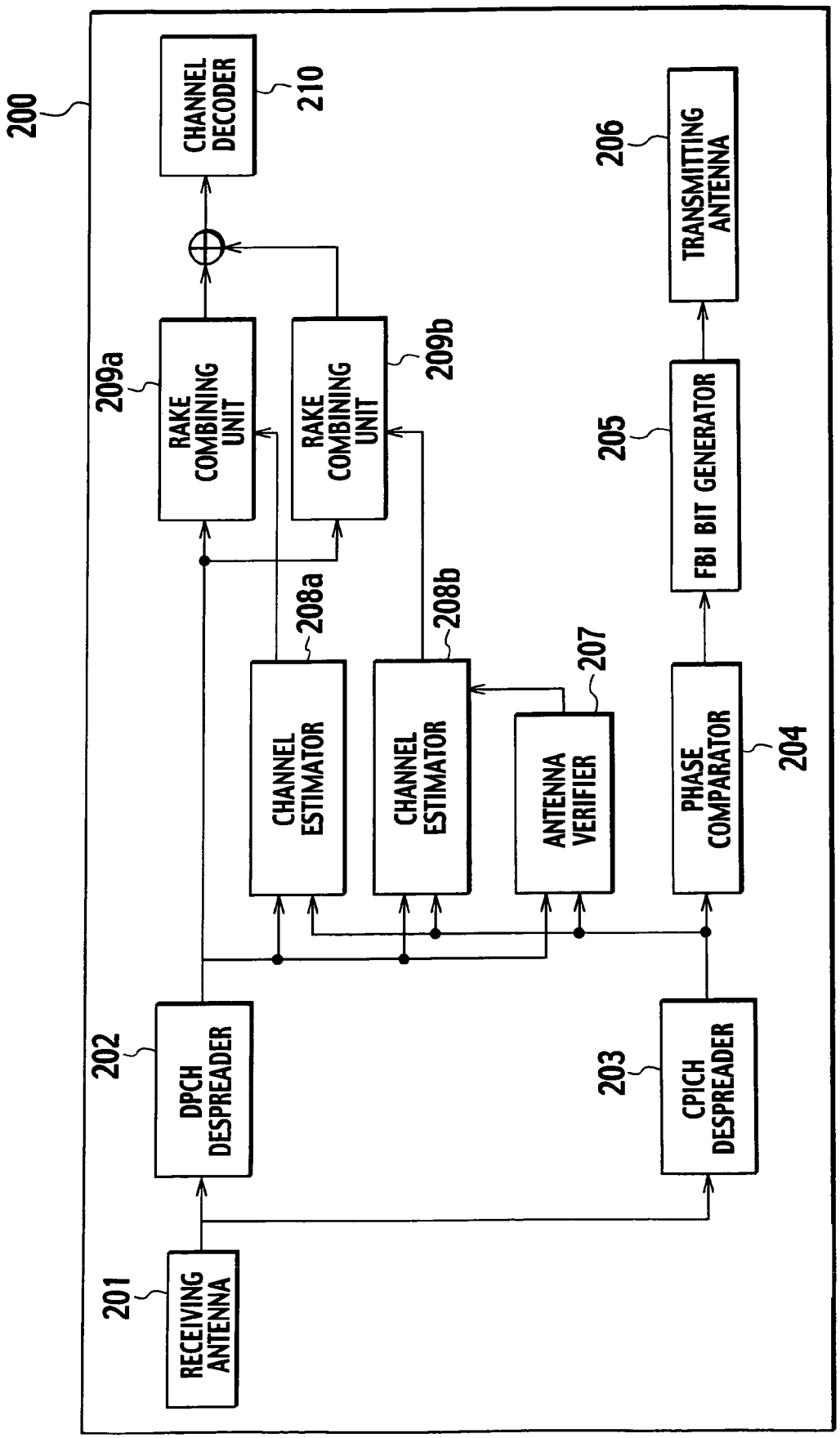
FIG. 3 is a block diagram showing a configuration of a mobile station according to the embodiment of the present invention.

Now, the configuration of the above-described mobile station 200 will be described below with reference to the accompanying drawing. FIG. 3 is a block diagram of the mobile station 200 according to the embodiment of the present invention. Here, the mobile station 200 generates the FBI used for the closed loop transmission diversity control, and performs the antenna verification for estimating the carrier phase difference of the downlink signals even when there is an error of the FBI in the radio section.

As shown in FIG. 3, the mobile station 200 includes a receiving antenna 201, a DPCH despreader 202, a CPICH despreader 203, a phase comparator 204, an FBI generator 205, a transmitting antenna 206, an antenna verifier 207, multiple channel estimators 208 (a channel estimator 208a and a channel estimator 208b), multiple RAKE combining units 209 (a RAKE combining unit 209a and a RAKE combining unit 209b), and a channel decoder 210.

Note that the mobile station 200 includes the receiving antenna 201 and the transmitting antenna 206 separately in this embodiment. However, the present invention is not limited only to this configuration. It is also possible to provide a single antenna configured to perform transmission and reception of signals.

The receiving antenna 201 receives the downlink signals transmitted through the downlink dedicated channel, and the common pilot signals transmitted through the downlink common pilot channel (CPICH).

The DPCH despreader 202 despreads the downlink signals transmitted through the downlink dedicated channel.

The CPICH despreader 203 despreads the common pilot signals for the two lines transmitted through the downlink common pilot channel (CPICH). Here, as described previously, the common pilot signals for the two lines are transmitted from the two transmitting antennas (the first transmitting antenna 111a and the second transmitting antenna 111b) included in the base station 100.

The phase comparator 204 calculates estimate values of a carrier phase, namely, $$\theta_{1,n}^{CP} \text{ and}$$

$$\theta_{2,n}^{CP}$$

in terms of the common pilot signals for the two lines which are despreaded by the CPICH despreader 203. Then, the phase comparator 204 compares the calculated estimate values, namely, $$\theta_{1,n}^{CP} \text{ and}$$

$$\theta_{2,n}^{CP}$$

The FBI generator 205 generates the FBI for adjusting the carrier phase difference of the downlink signals for each slot based on a result of comparison by the phase comparator 204.

To be more precise, the FBI generator 205 generates the FBI based on the following formula for an even-number slot n:

if $-\pi/2 \leq (\theta_{1,n}^{CP} - \theta_{2,n}^{CP}) \leq \pi/2$ then $b_n = 0$, otherwise $b_n = 1$ On the contrary, the FBI generator 205 generates the FBI based on the following formula for an odd-number slot n:

if $0 \leq (\theta_{1,n}^{CP} - \theta_{2,n}^{CP}) \leq \pi$ then $b_n = 0$, otherwise $b_n = 1$ The transmitting antenna 206 transmits the uplink control signals including the FBI generated by the FBI generator 205 to the base station 100 through the uplink dedicated control channel. Here, as described previously, the uplink control signals include the TPC command for the downlink channel, the TFCI, and the like in addition to the FBI.

The antenna verifier 207 performs the antenna verification for estimating the carrier phase difference of the downlink signals based on the downlink control signals (the dedicated pilot signals) transmitted through the downlink dedicated control channels and on the common pilot signals transmitted through the downlink common pilot channel (CPICH). Here, the antenna verification is described in 3GPP TS25.214 (Annex A. 1 Antenna verification), for example.

The antenna verification is an effective technique because it is possible to estimate the carrier phase difference of the downlink signals even if there is an error of the FBI in the radio section in the course of transmission through the uplink dedicated control channel.

The channel estimator 208a performs channel estimation of the signals transmitted from the first transmitting antenna 111a based on the common pilot signals which are transmitted from the first transmitting antenna 111a. Similarly, the channel estimator 208b performs channel estimation of the signals transmitted from the second transmitting antenna 111b based on the common pilot signals which are transmitted from the second transmitting antenna 111b.

The RAKE combining unit 209a performs a RAKE combining concerning the downlink signals by use of a channel estimate value obtained as a result of channel estimation by the channel estimator 208a. Similarly, the RAKE combining unit 209b performs a RAKE combining concerning the downlink signals by use of a channel estimate value obtained as a result of channel estimation by the channel estimator 208b.

The channel decoder 210 combines a signal subjected to the RAKE combining by the RAKE combining unit 209a and a signal subjected to the RAKE combining by the RAKE combining unit 209b in consideration of either the carrier phase difference of the downlink signals estimated by the antenna verification or a carrier phase difference obtained by an FBI bit previously generated by an FBI bit generator. Then, the channel decoder 210 decodes the downlink signals.

Figure 4:
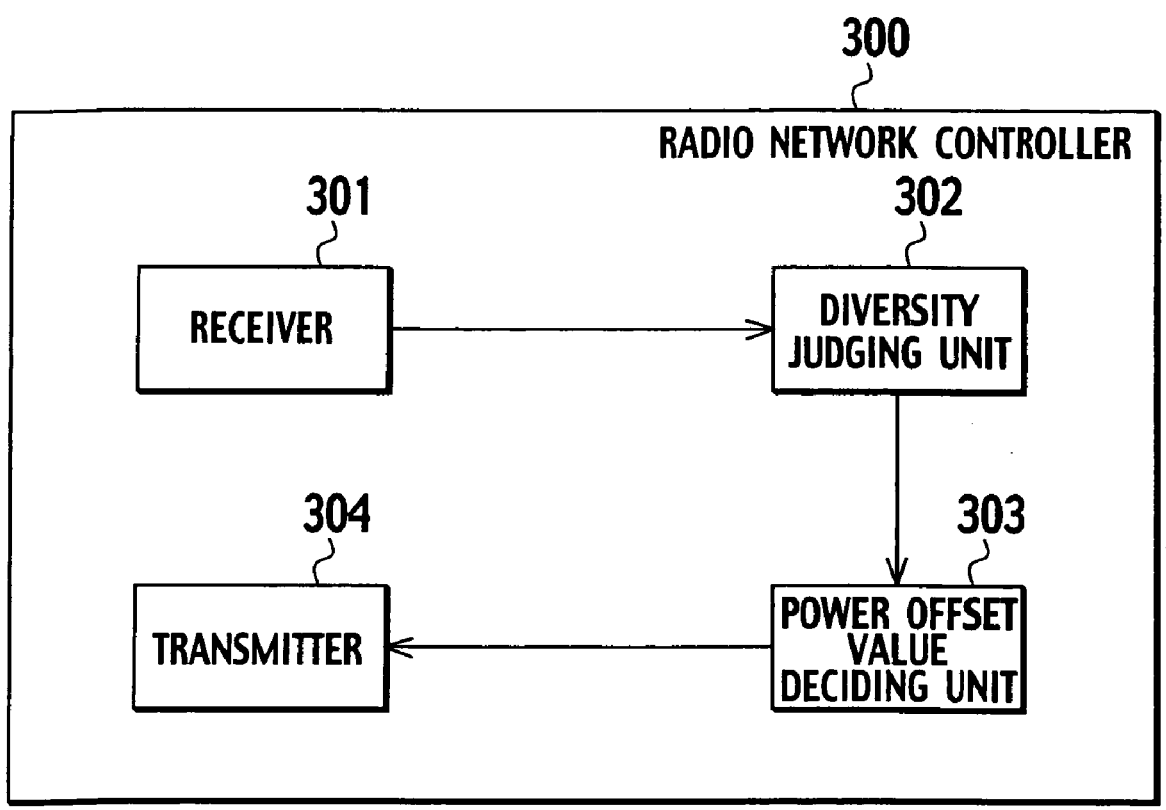
FIG. 4 is a block diagram showing a configuration of a radio network controller according to the embodiment of the present invention.

Now, the configuration of the above-described radio network controller 300 will be described below with reference to the accompanying drawing. FIG. 4 is a block diagram showing the configuration of the radio network controller 300.

As shown in FIG. 4, the radio network controller 300 includes a receiver 301, a diversity judging unit 302, a power offset value deciding unit 303, and a transmitter 304.

The receiver 301 is configured to receive information from the base station 100. For example, the receiver 301 receives an ID (a base station ID) for specifying the base station 100, and the like.

The diversity judging unit 302 judges whether or not the closed loop transmission diversity control is in operation between the base station 100 and the mobile station 200, based on the information (such as the base station ID) received from the base station 100.

For example, the diversity judging unit 302 judges whether or not the closed loop transmission diversity control is in operation by making reference to a table for linking the information indicating whether or not the closed loop transmission diversity control is in operation with the base station ID.

Alternatively, the diversity judging unit 302 may judge whether or not the closed loop transmission diversity control is in operation based on information contained in the information received from the base station 100, which indicates whether or not the closed loop transmission diversity control is in operation.

The power offset value deciding unit 303 decides a power offset value for controlling the transmission power of the downlink control signals based on a result of judgment by the diversity judging unit 302.

To be more precise, the power offset value deciding unit 303 decides to set the power offset value to Offset1 when the judgment is made that the closed loop transmission diversity control is in operation, and set the power offset value to Offset2 when the judgment is made that the closed loop transmission diversity control is not in operation.

Here, Offset1 is preferably greater value than Offset2 in order to improve accuracy of the above-described antenna verification. It is to be noted, however, that the present invention is not limited only to this configuration, and that Offset1 may be smaller value than Offset2.

The transmitter 304 is configured to transmit information to the base station 100. For example, the transmitter 304 transmits the power offset value decided by the power offset value deciding unit 303 to the base station 100.

Now, the configuration of the downlink signals (the downlink control signal and the downlink data signal) to be transmitted through the downlink dedicated channel will be described below.

Figure 5:
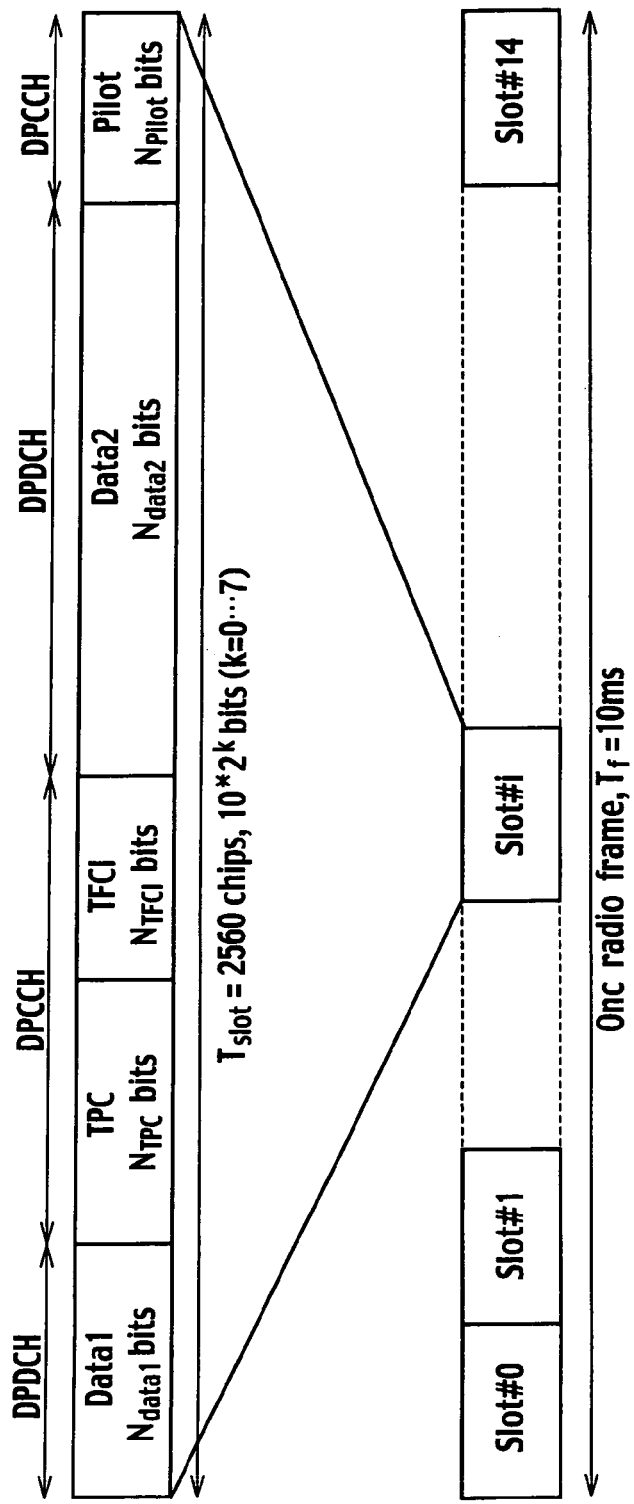
FIG. 5 is a view showing a configuration of a radio frame according to the embodiment of the present invention.

FIG. 5 is a view showing a configuration of a radio frame corresponding to the downlink dedicated channel according to the embodiment of the present invention.

As shown in FIG. 5, one radio frame has a time length equal to 10 msec and includes multiple slots (15 slots in this embodiment). Meanwhile, the downlink control signals (the TPC command for the uplink channel, the TFCI, the dedicated pilot signal, and the like) and the downlink data signal are multiplexed on the time basis in each slot.

In the above description, for example, the transmitter 304 can transmit the power offset value to the base station, using RADIO LINK SETUP REQUEST or RADIO LINK RECONFIGURATION PREPARE of NBAP signals in 3GPP. The power offset values can be equivalent to PO2 about TPC bits, and to PO3 about dedicated pilot bits.

(Transmission Power Controlling Method)

Next, a transmission power controlling method according to the embodiment of the present invention will be described with reference to the accompanying drawing. FIG. 6 is a flowchart showing the transmission power controlling method according to the embodiment of the present invention.

As shown in FIG. 6, in Step 10, the radio network controller 300 judges whether or not the closed loop transmission diversity control is in operation between the base station 100 and the mobile station 200. Here, the radio network controller 300 proceeds with Step 20 when the closed loop transmission diversity control is in operation or proceeds with Step 30 when the closed loop transmission diversity control is not in operation.

In Step 20, the radio network controller 300 sets the power offset value of the dedicated pilot signal included in the downlink control signals equal to Offset1.

In Step 30, the radio network controller 300 sets the power offset value of the dedicated pilot signal included in the downlink control signals equal to Offset2.

Here, as described previously, it is preferable to set Offset1 greater than Offset2.

Then, the radio network controller 300 transmits the decided power offset value to the base station 100, and the base station 100 controls the transmission power of the downlink control signals based on the received power offset value.

In this embodiment, it is also possible to define the downlink control signal applying the present invention as a TPC command for the uplink channel for controlling transmission power of the uplink signals.

(Functions and Effects of Communication System)

According to the communication system 1 according to the embodiment of the present invention, the communication system 1 controls the transmission power of the downlink control signals to be transmitted through the downlink control channel based on the result of judgment (whether or not the closed loop transmission diversity control is in operation) by the diversity judging unit 302. In this way, it is possible to use limited power resourced effectively, and to allow the transmission diversity control to function effectively.

To be more precise, the radio network controller 300 (the power offset value deciding unit 303) sets the power offset value to Offset1 (provided Offset1>Offset2) when the closed loop transmission diversity control is in operation. In this way, the communication system 1 allows the transmission diversity control to function effectively.

For example, when the power offset value is applied to the dedicated pilot signal used for the antenna verification, it is possible to improve accuracy of the antenna verification. Moreover, when the power offset value is applied to the TPC command for the uplink channel for controlling the transmission power of the uplink signals, it is possible to stabilize the signals to be transmitted through the uplink channel, and to reduce a risk of an error of the FBI in a radio section.

On the other hand, the radio network controller 300 (the power offset value deciding unit 303) sets the power offset value to Offset2 (provided, however, that Offset1>Offset2) when the closed loop transmission diversity control is not in operation. In this way, the communication system 1 can utilize the limited radio resources effectively.

MODIFIED EXAMPLE 1

Now, a modified example (a modified example 1) of the above-described embodiment will be described below with reference to the accompanying drawing. In the following, differences between the above-described embodiment and the modified example 1 will be mainly described.

To be more precise, in the modified example 1, the diversity judging unit 302 judges whether or not the downlink channel is a specific downlink channel prior to judging whether or not the closed loop transmission diversity control is in operation. Now, a transmission power controlling method will be described below in the case where the specific downlink channel is an A-DPCH associated by an HS-PDSCH.

Here, the HS-PDSCH is a channel shared by the multiple mobile stations 200, which is configured to carry data signals to be transmitted at a high speed. In the case of the HS-PDSCH, there is no dedicated pilot signal corresponding to the HS-PDSCH. Accordingly, the mobile station 200 performs the antenna verification based on a dedicated pilot signal transmitted through the A-DPCH associated by the HS-PDSCH.

FIG. 7 is a flowchart showing the transmission power controlling method according to the modified example 1 of the present invention.

As shown in FIG. 7, in Step 40, the radio network controller 300 judges whether or not the downlink channel used between the base station 100 and the mobile station 200 is the A-DPCH associated by the HS-PDSCH. The radio network controller 300 proceeds with Step 50 when the downlink channel is the A-DPCH or proceeds with Step 80 when the downlink channel is not the A-DPCH. Here, the case where the downlink channel is not the A-DPCH means a case where the downlink channel is a general DPCH.

In Step 50, the radio network controller 300 judges whether or not the closed loop transmission diversity control is in operation between the base station 100 and the mobile station 200. Here, the radio network controller 300 proceeds with Step 60 when the closed loop transmission diversity control is in operation or proceeds with Step 70 when the closed loop transmission diversity control is not in operation.

In Step 60, the radio network controller 300 sets the power offset value of the dedicated pilot signal included in the downlink control signals equal to Offset1.

In Step 70, the radio network controller 300 sets the power offset value of the dedicated pilot signal included in the downlink control signals equal to Offset2.

In Step 80, the radio network controller 300 sets the power offset value of the dedicated pilot signal included in the downlink control signals equal to Offset3.

Here, Offset1 is preferably greater than Offset2 and Offset3 in order to improve accuracy of the antenna verification.

Then, the radio network controller 300 transmits the decided power offset value to the base station 100, and the base station 100 controls the transmission power of the downlink control signals based on the received power offset value.

According to the communication system 1 according to the modified example 1, the radio network controller 300 sets the power offset value to Offset1 (Offset1>Offset2 and Offset3) only when the downlink channel is the A-DPCH and the closed loop transmission diversity control is in operation. In this way, it is possible to utilize the limited power resources effectively, to improve accuracy of the antenna verification, and thereby to improve an error rate of the downlink data signals transmitted through the HS-PDSCH and the like.

Therefore, the communication system 1 can utilize the limited power resources effectively, and allows the closed loop transmission diversity control to function effectively.

In this example, it is also possible to define the downlink control signal applying the present invention as the TPC command for the uplink channel for controlling the transmission power of the uplink signals.

Other Embodiments

Although the present invention has been described based on the certain embodiment as described above, it is to be understood that the description and the drawings constituting part of this disclosure will not limit the present invention. It is obvious to those skilled persons in the art that various other embodiments, examples, and operation techniques are possible from the teachings of this disclosure.

In the above-described embodiment, the radio network controller 300 judges whether or not the closed loop transmission diversity control is in operation. However, the present invention is not limited only to this configuration. For example, the base station 100 may judge whether or not the closed loop transmission diversity control is in operation.

Moreover, in the above-described embodiment, the dedicated pilot signal is the signal of which the transmission power is controlled based on the judgment whether or not the closed loop transmission diversity control is in operation. However, the present invention is not limited only to this configuration. For example, as described previously, the TPC command for the uplink channel included in the downlink control signals or the TFCI included in the downlink control signals may be the signal of which the transmission power is controlled.

Furthermore, in the above-described embodiment, the transmission power of the downlink control signals is controlled based on the judgment whether or not the closed loop transmission diversity control is in operation. However, the present invention is not limited only this configuration. For example, the transmission power of the downlink control signals may be controlled based on a judgment whether or not open loop transmission diversity control (such as space time transmit diversity (STTD) or a transmission diversity configured to perform diversity control of the downlink signals by observing the uplink signals) is in operation.

What is claimed is:

1. A communication system configured to cause a base station to transmit a downlink control signal to a mobile station through a downlink control channel and to cause the base station to transmit a downlink data signal to the mobile station through a downlink data channel, comprising:

a diversity judging unit configured to judge whether or not transmission diversity control to adjust a carrier phase difference of at least one set of a plurality of the downlink data signals and a plurality of the downlink control signals transmitted through a plurality of antennas is performed; and a transmission power control unit configured to control transmission power of the downlink control signals based on a result of judgment by the diversity judging unit.

2. The communication system according to claim 1, wherein the transmission diversity control is closed loop transmission diversity control configured to cause the base station to adjust the carrier phase difference of at least one set of the plurality of the downlink data signals and the plurality of the downlink control signals based on feedback information transmitted by the mobile station through an uplink control channel.

3. The communication system according to claim 1, further comprising:

a channel judging unit configured to judge whether or not a downlink channel including the downlink data channel and the downlink control channel is a specific downlink channel, wherein the transmission power control unit controls the transmission power of the downlink control signals based on a result of judgment by the channel judging unit.

4. The communication system according to claim 3, wherein the channel judging unit judges whether or not the downlink channel is an associated downlink dedicated channel to be associated by a downlink shared channel.

5. The communication system according to claim 1, wherein the transmission power control unit controls transmission power of a pilot signal unique to the mobile station to be transmitted through a downlink dedicated control channel.

6. The communication system according to claim 1, wherein the transmission power control unit controls transmission power of a transmission power control signal used to control transmission power of a signal transmitted through an uplink channel, the transmission power control signal being transmitted through the downlink dedicated control channel.

7. The communication system according to claim 1, wherein the transmission power control unit controls the transmission power of the downlink control signals such that the transmission power of the downlink control signals becomes larger in a case of performing the transmission diversity control than in a case of not performing the transmission diversity control.

8. A base station configured to transmit a downlink control signal to a mobile station through a downlink control channel and to transmit a downlink data signal to the mobile station through a downlink data channel, comprising:

a diversity judging unit configured to judge whether or not transmission diversity control to adjust a carrier phase difference of at least one set of a plurality of the downlink data signals and a plurality of the downlink control signals transmitted through a plurality of antennas is performed; and a transmission power control unit configured to control transmission power of the downlink control signals based on a result of judgment by the diversity judging unit.

9. A radio network controller configured to control a base station which transmits a downlink control signal to a mobile station through a downlink control channel and transmits a downlink data signal to the mobile station through a downlink data channel, comprising:

a diversity judging unit configured to judge whether or not transmission diversity control to adjust a carrier phase difference of at least one set of a plurality of the downlink data signals and a plurality of the downlink control signals transmitted through a plurality of antennas is performed; and a transmission power control unit configured to cause the base station to control transmission power of the downlink control signals based on a result of judgment by the diversity judging unit.

10. A transmission power controlling method applicable to a communication system configured to transmit a downlink control signal to a mobile station through a downlink control channel and to transmit a downlink data signal to the mobile station through a downlink data channel, comprising the steps of:

judging whether or not transmission diversity control to adjust a carrier phase difference of at least one set of a plurality of the downlink data signals and a plurality of the downlink control signals transmitted through a plurality of antennas is performed; and controlling transmission power of the downlink control signals based on a result of judgment whether or not the transmission diversity is performed.

* * * * *